United States Patent
Li et al.

(10) Patent No.: US 12,371,066 B2
(45) Date of Patent: Jul. 29, 2025

(54) AUTOMATIC DRIVING DECISION MAKING METHOD, SYSTEM AND DEVICE AND COMPUTER STORAGE MEDIUM

(71) Applicant: INSPUR (BEIJING) ELECTRONIC INFORMATION INDUSTRY CO., LTD., Beijing (CN)

(72) Inventors: Ruyang Li, Beijing (CN); Rengang Li, Beijing (CN); Yaqian Zhao, Beijing (CN); Xuelei Li, Beijing (CN); Hui Wei, Beijing (CN); Zhe Xu, Beijing (CN); Yaqiang Zhang, Beijing (CN)

(73) Assignee: INSPUR (BEIJING) ELECTRONIC INFORMATION INDUSTRY CO., LTD., Beijing (CN)

( * ) Notice: Subject to any disclaimer, the term of this patent is extended or adjusted under 35 U.S.C. 154(b) by 0 days.

(21) Appl. No.: 18/246,126

(22) PCT Filed: Jul. 29, 2021

(86) PCT No.: PCT/CN2021/109174
§ 371 (c)(1),
(2) Date: Mar. 21, 2023

(87) PCT Pub. No.: WO2022/088798
PCT Pub. Date: May 5, 2022

(65) Prior Publication Data
US 2023/0365163 A1 Nov. 16, 2023

(30) Foreign Application Priority Data
Oct. 29, 2020 (CN) .......................... 202011181627.3

(51) Int. Cl.
*B60W 60/00* (2020.01)
*B60W 50/00* (2006.01)

(52) U.S. Cl.
CPC .... *B60W 60/0027* (2020.02); *B60W 50/0097* (2013.01); *B60W 2554/40* (2020.02); *B60W 2556/40* (2020.02)

(58) Field of Classification Search
CPC ......... B60W 60/0027; B60W 50/0097; B60W 2554/40; B60W 2556/40; B60W 40/04;
(Continued)

(56) References Cited

U.S. PATENT DOCUMENTS

2017/0169357 A1* 6/2017 Caspi ................... G06N 99/005
2020/0234068 A1* 7/2020 Zhang ................ G06K 9/00892
(Continued)

FOREIGN PATENT DOCUMENTS

CN 107168303 A 9/2017
CN 107506830 A * 12/2017 ............... G06N 7/00
(Continued)

OTHER PUBLICATIONS

S. Aradi, "Survey of Deep Reinforcement Learning for Motion Planning of Autonomous Vehicles," in IEEE Transactions on Intelligent Transportation Systems, vol. 23, No. 2, pp. 740-759, 2020, doi: 10.1109/TITS.2020.3024655. (Year: 2020).*

(Continued)

*Primary Examiner* — Ramya P Burgess
*Assistant Examiner* — Brittany Renee Peko
(74) *Attorney, Agent, or Firm* — Dennemeyer & Associates LLC

(57) ABSTRACT

An automatic driving method includes following steps: S101: acquiring real-time traffic environment information in a travel process of an autonomous vehicle at a current moment; S102: mapping the real-time traffic environment information based on a preset mapping relationship to obtain mapped traffic environment information; S103: adjusting a target deep reinforcement learning model based on a pre-
(Continued)

stored existing deep reinforcement learning model and the mapped traffic environment information; and S104: judging whether automatic driving is finished, and in response to the automatic driving is not finished, returning to perform the step of acquiring the real-time traffic environment information in the travel process of the autonomous vehicle at the current moment. An automatic driving system, an automatic driving device and a computer medium storing the automatic driving method are further provided.

17 Claims, 3 Drawing Sheets

(58) Field of Classification Search
CPC ......... B60W 2556/10; B60W 60/0016; B60W 2554/00; G06N 3/045; G06N 3/092; G06N 3/08
See application file for complete search history.

(56) References Cited

U.S. PATENT DOCUMENTS

2020/0249685 A1* 8/2020 Elluswamy .......... G05D 1/0221
2020/0307577 A1 10/2020 Nageshrao et al.
2023/0140540 A1* 5/2023 Zheng ................ G06N 3/006

FOREIGN PATENT DOCUMENTS

| | | | | |
|---|---|---|---|---|
| CN | 109835375 A | 6/2019 | | |
| CN | 110647839 A | 1/2020 | | |
| CN | 110673602 A | 1/2020 | | |
| CN | 111123738 A | 5/2020 | | |
| CN | 111222630 A | * 6/2020 | ............ | G06N 20/00 |
| CN | 111273676 A | 6/2020 | | |
| CN | 111401556 A | 7/2020 | | |
| CN | 20200095590 A | * 8/2020 | ............ | B60W 30/14 |
| CN | 112249032 A | 1/2021 | | |
| EP | 3570214 A2 | 11/2019 | | |
| KR | 2166811 B1 | 10/2020 | | |

OTHER PUBLICATIONS

International search report for PCT/CN2021/109174 mailed on Sep. 29, 2021.
Search report for Chinese application 202011181627.3, filed Oct. 29, 2020.

* cited by examiner

AUTOMATIC DRIVING DECISION MAKING METHOD, SYSTEM AND DEVICE AND COMPUTER STORAGE MEDIUM

CROSS-REFERENCE TO RELATED APPLICATIONS

This is a 35 U.S.C. 371 National Stage Patent Application of International Application No. PCT/CN2021/109174, filed Jul. 29, 2021, which claims priority to Chinese application 202011181627.3, filed Oct. 29, 2020, each of which is hereby incorporated by reference in its entirety.

TECHNICAL FIELD

The present disclosure relates to the technical field of automatic driving, in particular to an automatic driving decision making method, system and device and a computer storage medium.

BACKGROUND

In modern urban traffic, the number of motor vehicles is increased day by day, which causes serious road congestion and frequent traffic accidents. To reduce harm caused by human factors to the maximum extent, people start to focus on an automatic driving field. Deep Reinforcement Learning (DRL) combined with deep learning is a kind of machine learning method, which is rapidly developed in recent years and has intelligent agent-environment interaction and a sequence decision making mechanism approaching a human learning process and thus is also called as a key step for realizing Artificial General Intelligence (AGI) to be applied to an automatic driving decision making process.

Deep reinforcement learning can guide the vehicles to learn automatic driving from the beginning and make automatic driving be learned through a constant "trial and error" manner in a brand new traffic scene, and thus has wide applicability. But, the vehicles can make a desirable decision through training via several or even tens of steps in a process of learning automatic driving from the beginning, and as a result, sampling efficiency is low, which is inconsistent to an instant decision making requirement in the automatic driving scene. At the same time, variance will be large when a poor-action step is selected, which is embodied in unstable vehicle driving or even accidents such as lane overrun and collisions.

SUMMARY

Embodiments of the disclosure provides following technical solutions: An automatic driving method, includes:
acquiring real-time traffic environment information in a travel process of an autonomous vehicle at a current moment;
mapping the real-time traffic environment information based on a preset mapping relationship to obtain mapped traffic environment information;
adjusting a target deep reinforcement learning model based on a pre-stored existing deep reinforcement learning model and the mapped traffic environment information; and
judging whether automatic driving is finished, and in response to the automatic driving is not finished, returning to perform the step of acquiring the real-time traffic environment information in the travel process of the autonomous vehicle at the current moment,
wherein the mapping relationship includes a mapping relationship between the real-time traffic environment information and existing traffic environment information of the existing deep reinforcement learning model.

In some embodiments, the step of adjusting a target deep reinforcement learning model based on a pre-stored existing deep reinforcement learning model and the mapped traffic environment information includes:
processing the mapped traffic environment information based on parameters of an existing policy network of the existing deep reinforcement learning model to obtain a vehicle action;
calculating a value of a value function of the vehicle action based on an evaluation network of the target deep reinforcement learning model;
acquiring a return value of the vehicle action; and
updating parameters of the evaluation network based on the return value and the value of the value function.

In some embodiments, the step of updating parameters of the evaluation network based on the return value and the value of the value function includes:
calculating a loss value by a calculation formula of loss function based on the return value and the value of the value function; and
updating the parameters of the evaluation network by minimizing the loss value,
wherein the calculation formula of loss function includes:

$$L = \frac{1}{N}\sum_{t}(r_t + \gamma Q'_\omega(s_{t+1}, a_{t+1}) - Q_\omega(s_t, a_t))^2;$$

wherein L represents the loss value; N represents a number of collected samples $r_t$ represents a return value at time t; $\gamma$ represents a discount factor, and $0<\gamma<1$; $Q_\omega'(s_{t+1}, a_{t+1})$ represents a value of the value function calculated by a target network in the evaluation network at time t+1; $s_{t+1}$ represents traffic environment information at time t+1; $a_{t+1}$ represents a vehicle action at time t+1; $Q_\omega(s_t, a_t)$ represents a value of the value function calculated by a prediction network in the evaluation network at time t; $s_t$ represents traffic environment information at time t; and $a_t$ represents a vehicle action at time t.

In some embodiments, after updating the parameters of the evaluation network based on the return value and the value of the value function, the method further includes:
updating parameters of a policy network of the target deep reinforcement learning model.

In some embodiments, before mapping the real-time traffic environment information based on the preset mapping relationship to obtain the mapped traffic environment information, the method further includes:
acquiring target traffic environment information;
reading the existing traffic environment information;
calculating a distance value between the target traffic environment information and the existing traffic environment information in a reproducing kernel Hilbert space; and
determining the mapping relationship by minimizing the distance value.

In some embodiments, the step of calculating the distance value between the target traffic environment information and the existing traffic environment information in the reproducing kernel Hilbert space includes:

calculating the distance value between the target traffic environment information and the existing traffic environment information by a calculation formula of distance value in the reproducing kernel Hilbert space, wherein the calculation formula of distance value includes:

$$MMD_H(D_S, D_T) = \left\| \frac{1}{n}\sum_{i=1}^{n} A^T s_{Si} - \frac{1}{m}\sum_{j=1}^{m} A^T s_{Tj} \right\|_H ;$$

wherein $MMD_H(D_S, D_T)$ represents the distance value; $D_S$ represents the existing traffic environment information; $D_T$ represents the target traffic environment information; n represents the number of samples in the existing traffic environment information; m represents the number of samples in the target traffic environment information; A represents the mapping relationship; T represents transposition; $s_S$ represents traffic environment information in the existing traffic environment information; $s_T$ represents traffic environment information in the target traffic environment information; and H represents the reproducing kernel Hilbert space.

In some embodiments, the step of determining the mapping relationship by minimizing the distance value includes:

determining the mapping relationship by minimizing the distance value based on a regular linear regression method or a support vector machine method or a principal component analysis method.

An automatic driving system, includes:

a first acquisition component configured to acquire real-time traffic environment information in a travel process of an autonomous vehicle at a current moment;

a first mapping component configured to map the real-time traffic environment information based on a preset mapping relationship to obtain mapped traffic environment information;

a first adjustment component configured to adjust a target deep reinforcement learning model based on a pre-stored existing deep reinforcement learning model and the mapped traffic environment information; and a first judgment component configured to judge whether automatic driving is finished, and in response to the automatic driving is not finished, return to perform the step of acquiring the real-time traffic environment information in the travel process of the autonomous vehicle at the current moment, wherein the mapping relationship includes a mapping relationship between the real-time traffic environment information and existing traffic environment information of the existing deep reinforcement learning model.

An automatic driving device, includes:

a memory configured to store computer programs; and a processor configured to perform the computer programs to realize steps of any above automatic driving method.

A non-transitory computer-readable storage medium storing computer program that, when executed by a processor, cause the processor to realize steps of any above automatic driving method.

BRIEF DESCRIPTION OF THE DRAWINGS

In order to describe technical solutions in embodiments of the present invention or in the prior art more clearly, the drawings required to be used in descriptions of the embodiments or the prior art will be simply introduced below, obviously, the drawings described below are only some embodiments of the present invention, and those ordinary skill in the art can obtain other embodiments according to the drawings without creative work.

DETAILED DESCRIPTION OF THE EMBODIMENTS

Technical solutions in embodiments of the present disclosure are clearly and completely described below in combination with drawings in the embodiments of the present disclosure, and it is apparent that the described embodiments are only a part rather all of embodiments of the present disclosure. All other embodiments obtained by those ordinary skill in art without creative labor based on the embodiments of the present disclosure shall fall within the scope of protection of the present disclosure.

Figure 1:
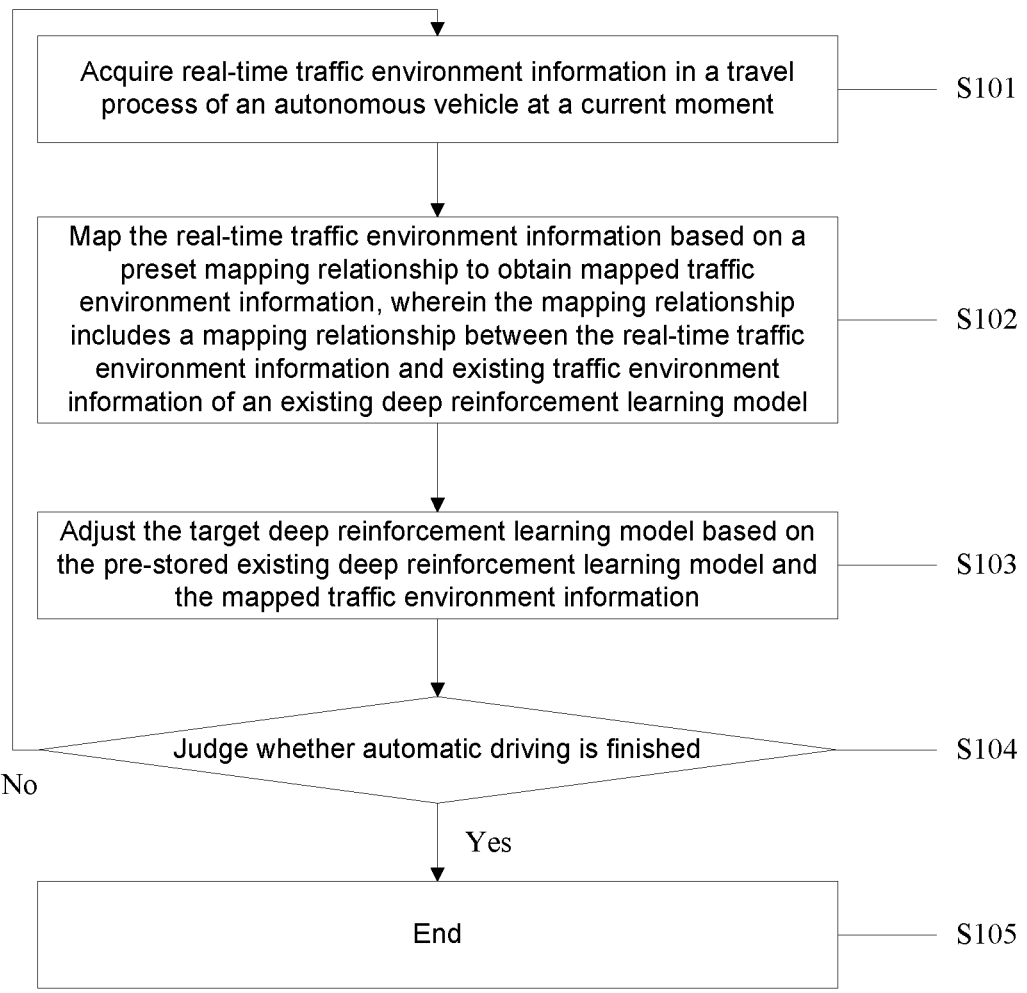
FIG. 1 is a flowchart of an automatic driving method provided by an embodiment of the present disclosure.

Please refer to FIG. 1, and FIG. 1 is a flowchart of an automatic driving method provided by an embodiment of the present disclosure.

The embodiment of the present disclosure provides an automatic driving method, including following steps:

S101: Acquiring real-time traffic environment information in a travel process of an autonomous vehicle at a current moment.

During practical application, a next driving action of the autonomous vehicle needs to be predicted according to current traffic environment information in the automatic driving process, and thus, the real-time traffic environment information in the driving process of the autonomous vehicle at the current moment can be firstly acquired. The type of the real-time traffic environment information can be determined according to actual needs, for example, a driving environment state such as weather data, traffic lights, traffic topological information, positions and running states of the autonomous vehicle and other traffic participants and other information can be acquired by a camera, a global positioning system, an inertial measurement unit, a millimeter-wave radar, a laser radar and other vehicle-mounted sensor apparatuses. Direct original image data and other original traffic environment information acquired by the camera directly serve as the real-time traffic environment information, and a depth graph and a semantic segmentation graph obtained by processing, via RefineNet and other models, the original traffic environment information can serve as the real-time traffic environment information, and the like.

S102: Mapping the real-time traffic environment information based on a preset mapping relationship to obtain mapped traffic environment information, where the mapping relationship includes a mapping relationship between the real-time traffic environment information and existing traffic environment information of an existing deep reinforcement learning model.

During practical application, the existing deep reinforcement learning model needs to be utilized in the present application for adjusting a target deep reinforcement learning model, and a processing result may not be matched with the real-time traffic environment information in response to the existing deep reinforcement learning model is directly utilized for processing the real-time traffic environment information. To avoid the situation, the real-time traffic environment information can be firstly mapped on the basis of the preset mapping relationship to obtain the mapped traffic environment information; the mapping relationship includes the mapping relationship between the real-time traffic environment information and the existing traffic environment information of the existing deep reinforcement learning model, and thus, the mapped traffic environment information can meet a processing requirement of the existing deep reinforcement learning model and can carry related information of the real-time traffic environment information, and accordingly, accuracy of adjustment on the target deep reinforcement learning model can be guaranteed if the target deep reinforcement learning model is adjusted by the mapped traffic environment information later.

It should be noted that the existing deep reinforcement learning model refers to a trained deep reinforcement learning model meeting conditions, such as a deep reinforcement learning model obtained after training for a preset duration according to the existing traffic environment information and a deep reinforcement learning model obtained after training by a preset step size according to the existing traffic environment information. A process of training the deep learning model based on the existing traffic environment information can refer to the prior art, which is not specifically limited by the present application.

S103: Adjusting the target deep reinforcement learning model based on the pre-stored existing deep reinforcement learning model and the mapped traffic environment information.

During practical application, after mapping the real-time traffic environment information based on the preset mapping relationship to obtain the mapped traffic environment information, the target deep reinforcement learning model can be adjusted on the basis of the pre-stored existing deep reinforcement learning model and the mapped traffic environment information.

It should be noted that the process of adjusting the target deep reinforcement learning model can be determined according to actual needs and an structure of the target deep reinforcement learning model, and the structure of the target deep reinforcement learning model can be determined according to an applied deep reinforcement learning algorithm such as a Deep-Q-Network (DQN) algorithm, a Deep Deterministic Policy Gradient (DDPG) algorithm, an Asynchronous Advantage Actor-Critic (A3C) algorithm, a Soft Actor-Critic (SAC) algorithm, a Twin Delayed Deep Deterministic policy gradient (TD3) algorithm, which is not specifically limited by the present application.

S104: Judging whether automatic driving is finished, in response to the automatic driving is not finished, return to perform the step S101, and in response to the automatic driving is finished, perform a step S105: End.

During practical application, only the real-time traffic environment information at the current moment is applied in the adjusting process every time, parameters of the target deep reinforcement learning model may be completed through multi-time adjustment, and thus, after adjusting the target deep reinforcement learning model based on the pre-stored existing deep reinforcement learning model and the mapped traffic environment information, whether automatic driving is finished may be judged, where in response to the automatic driving is not finished, the step of acquiring the real-time traffic environment information in the travel process of the autonomous vehicle at the current moment is performed; and in response to the automatic driving is finished, the process is directly ended.

It should be noted that a condition for judging whether automatic driving is finished can be determined according to actual needs, and a condition for finishing automatic driving may be an adjustment frequency reaching a preset frequency or an adjustment duration reaching a preset duration, which is not specifically limited by the present application.

The automatic driving method provided by the present application includes acquiring the real-time traffic environment information in the travel process of the autonomous vehicle at the current moment; mapping the real-time traffic environment information based on the preset mapping relationship to obtain the mapped traffic environment information; adjusting the target deep reinforcement learning model based on the pre-stored existing deep reinforcement learning model and the mapped traffic environment information; and judging whether automatic driving is finished, and in response to the automatic driving is not finished, returning to perform the step of acquiring the real-time traffic environment information in the travel process of the autonomous vehicle at the current moment, wherein the mapping relationship includes the mapping relationship between the real-time traffic environment information and the existing traffic environment information of the existing deep reinforcement learning model. In the present application, adjusting the target deep reinforcement learning model by the mapping relationship and the existing deep reinforcement learning model may avoid adjustment on the target deep reinforcement learning model from the beginning, accelerate decision making efficiency of the target deep reinforcement learning model, and then realize rapid and stable automatic driving.

Figure 2:
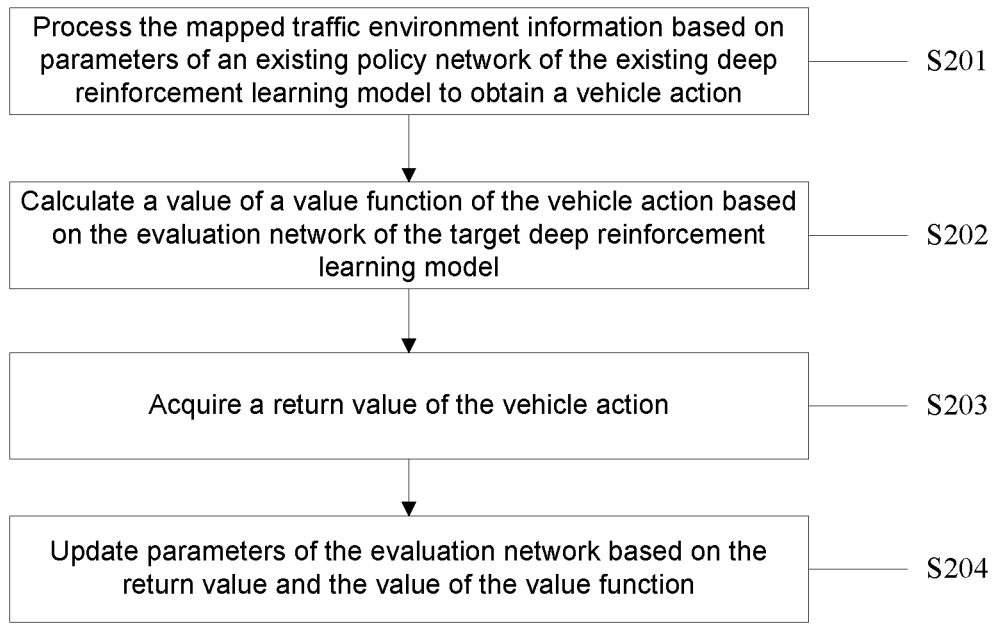
FIG. 2 is an adjustment flowchart for a target deep reinforcement learning model in an embodiment of the present disclosure.

Please refer to FIG. 2, and FIG. 2 is an adjustment flowchart for the target deep reinforcement learning model in an embodiment of the present disclosure.

In the automatic driving method provided by the embodiment of the present disclosure, the process of adjusting the target deep reinforcement learning model based on the pre-stored existing deep reinforcement learning model and the mapped traffic environment information may include following steps:

S201: Processing the mapped traffic environment information based on parameters of an existing policy network of the existing deep reinforcement learning model to obtain a vehicle action.

During practical application, under a situation that the existing deep reinforcement learning model and the target deep reinforcement learning model both include the policy network and an evaluation network, the mapped traffic environment information can be firstly processed on the basis of the parameters of the existing policy network of the existing deep reinforcement learning model to obtain the vehicle action such as acceleration, deceleration, diversion, lane changing and braking.

S202: Calculating a value of a value function of the vehicle action based on the evaluation network of the target deep reinforcement learning model.

During practical application, after the mapped traffic environment information is processed on the basis of the parameters of the existing policy network of the existing deep reinforcement learning model to obtain the vehicle action, the value of the value function of the vehicle action can be calculated on the basis of the evaluation network of the target deep reinforcement learning model, thereby evaluating decision making capacity of the policy network by the value of the value function.

S203: Acquiring a return value of the vehicle action.

During practical application, after the value of the value function of the vehicle action is calculated on the basis of a target evaluation network of the target deep reinforcement learning model, the return value of the vehicle action can be acquired as well. In some embodiments, the return value can be given to the autonomous vehicle according to the vehicle action adopted by the autonomous vehicle in combination with a set standard such as an average running speed of the autonomous vehicle, a lane off center distance, red light running, collisions and other factors.

S204: Updating parameters of the evaluation network based on the return value and the value of the value function.

During practical application, after the return value of the vehicle action is acquired, the parameters of the evaluation network can be updated on the basis of the return value and the value of the value function.

In an application scene, in the process of updating the parameters of the evaluation network based on the return value and the value of the value function, a loss value can be calculated by a calculation formula of loss function based on the return value and the value of the value function; and the parameters of the evaluation network are updated by minimizing the loss value, where the calculation formula of loss function includes:

$$L = \frac{1}{N}\sum_t (r_t + \gamma Q'_\omega(s_{t+1}, a_{t+1}) - Q_\omega(s_t, a_t))^2;$$

Wherein L represents the loss value; N represents a number of collected samples; $r_t$ represents a return value at time t; $\gamma$ represents a discount factor, and $0<\gamma<1$; $Q_\omega'(s_{t+1}, a_{t+1})$ represents a value of the value function calculated by a target network in the evaluation network at time t+1; $s_{t+1}$ represents traffic environment information at time t+1; $a_{t+1}$ represents a vehicle action at time t+1; $Q_\omega(s_t, a_t)$ represents a value of the value function calculated by a prediction network in the evaluation network at time t; $s_t$ represents traffic environment information at time t; and $a_t$ represents a vehicle action at time t.

In the automatic driving method provided by the embodiment of the present disclosure, after updating the parameters of the evaluation network based on the return value and the value of the value function, parameters of the policy network of the target deep reinforcement learning model can be updated to further guarantee accuracy of the target deep reinforcement learning model. The process of updating the parameters of the policy network can be determined according to actual needs, which is not specifically limited by the present disclosure.

Before mapping the real-time traffic environment information based on the preset mapping relationship to obtain the mapped traffic environment information, the automatic driving method provided by the embodiment of the present disclosure may further include: acquiring target traffic environment information; reading existing traffic environment information; calculating a distance value between the target traffic environment information and the existing traffic environment information in a reproducing kernel Hilbert space; and determining the mapping relationship by minimizing the distance value. Namely, the present disclosure can rapidly determine the mapping relationship through the target traffic environment information, the existing traffic environment information and the reproducing kernel Hilbert space.

In an application scene, in the process of calculating the distance value between the target traffic environment information and the existing traffic environment information in the reproducing kernel Hilbert space, the distance value between the target traffic environment information and the existing traffic environment information in the reproducing kernel Hilbert space can be calculated by a calculation formula of distance value; and the calculation formula of distance value includes:

$$MMD_H(D_S, D_T) = \left\| \frac{1}{n}\sum_{i=1}^n A^T s_{Si} - \frac{1}{m}\sum_{j=1}^m A^T s_{Tj} \right\|_H ;$$

wherein $MMD_H(D_S, D_T)$ represents the distance value; $D_S$ represents the existing traffic environment information; $D_T$ represents the target traffic environment information; n represents the number of samples in the existing traffic environment information; m represents the number of samples in the target traffic environment information; A represents the mapping relationship; T represents transposition; $s_S$ represents traffic environment information in the existing traffic environment information; $s_T$ represents traffic environment information in the target traffic environment information; and H represents the reproducing kernel Hilbert space.

In an application scene, in the process of determining the mapping relationship by minimizing the distance value, the mapping relationship can be determined by minimizing the distance value based on a regular linear regression method or a support vector machine method or a principal component analysis method or the like.

In an application scene, in the process of acquiring the target traffic environment information, a simple deep learning algorithm such as the DQN algorithm can be used for pre-training the autonomous vehicle in a target field, such as constructing two neural networks the same in structure but different in parameter updating frequency, namely, a Target Net updated at a certain time interval and a Pred Net updated step by step; and the Target Net and the Pred Net both can use a simple three-layered neural network, and only a hidden layer is included in the middle; and at the time, a traffic environment state collected by a vehicle sensor apparatus is input to calculate and output a target value $Q_{target}$ and a predicted value $Q_{pred}$, and an action $a_{Tt}$ corresponding to the maximum value is selected as a driving action of the autonomous vehicle. Then, return $r_{Tt}$ and a new traffic environment state $a_{Tt+1}$ are acquired, and learning experience $c_{Ti}=(s_{Ti}, a_{Ti}, r_{Ti}, s_{ti+1})$ is stored into a playback buffer area $D_T$, thereby generating the target traffic environment information.

Figure 3:
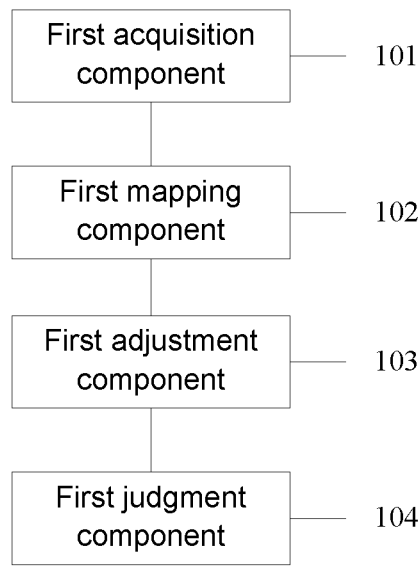
FIG. 3 is a structural schematic diagram of an automatic driving system provided by an embodiment of the present disclosure.

Please refer to FIG. 3, and FIG. 3 is a structural schematic diagram of an automatic driving system provided by an embodiment of the present disclosure.

The automatic driving system provided by the embodiment of the present application may include:
  a first acquisition component 101 configured to acquire real-time traffic environment information in a travel process of an autonomous vehicle at a current moment;
  a first mapping component 102 configured to map the real-time traffic environment information based on a preset mapping relationship to obtain mapped traffic environment information;

a first adjustment component 103 configured to adjust a target deep reinforcement learning model based on a pre-stored existing deep reinforcement learning model and the mapped traffic environment information; and a first judgment component 104 configured to judge whether automatic driving is finished, and in response to the automatic driving is not finished, return to perform the step of acquiring the real-time traffic environment information in the travel process of the autonomous vehicle at the current moment, wherein the mapping relationship includes a mapping relationship between the real-time traffic environment information and existing traffic environment information of an existing deep reinforcement learning model.

According to the automatic driving system provided by the embodiment of the present disclosure, the first adjustment component may include:

a first processing unit configured to process the mapped traffic environment information based on parameters of an existing policy network of the existing deep reinforcement learning model to obtain a vehicle action;

a first computing unit configured to calculate a value of a value function of the vehicle action based on an evaluation network of the target deep reinforcement learning model;

a first acquisition unit configured to acquire a return value of the vehicle action; and a first update unit configured to update parameters of the evaluation network based on the return value and the value of the value function.

According to the automatic driving system provided by the embodiment of the present disclosure, the first update unit may include:

a second computing unit configured to calculate a loss value by a calculation formula of loss function based on the return value and the value of the value function; and a second update unit configured to update the parameters of the evaluation network by minimizing the loss value, wherein the calculation formula of loss function includes:

$$L = \frac{1}{N}\sum_t (r_t + \gamma Q'_\omega(s_{t+1}, a_{t+1}) - Q_\omega(s_t, a_t))^2;$$

Wherein L represents the loss value; N represents a number of collected samples; $r_t$ represents a return value at time t; $\gamma$ represents a discount factor, and $0<\gamma<1$; $Q_\omega'(s_{t+1}, a_{t+1})$ represents a value of the value function calculated by a target network in the evaluation network at time t+1; $s_{t+1}$ represents traffic environment information at time t+1; $a_{t+1}$ represents a vehicle action at time t+1; $Q_\omega(s_t, a_t)$ represents a value of the value function calculated by a prediction network in the evaluation network at time t; $s_t$ represents traffic environment information at time t; and $a_t$ represents a vehicle action at time t.

The automatic driving system provided by the embodiment of the present disclosure may further include:

a third update unit configured to update parameters of the policy network of the target deep reinforcement learning model after the first update unit updates parameters of the target evaluation network based on the return value and the value of the value function.

The automatic driving system provided by the embodiment of the present disclosure may further include:

a second acquisition component configured to acquire target traffic environment information before the first mapping component maps the real-time traffic environment information based on the preset mapping relationship to obtain the mapped traffic environment information;

a first read component configured to read the existing traffic environment information;

a first computing component configured to calculate a distance value between the target traffic environment information and the existing traffic environment information in a reproducing kernel Hilbert space; and a first determine component configured to determine the mapping relationship by minimizing the distance value.

According to the automatic driving system provided by the embodiment of the present disclosure, the first computing component may include:

a third computing unit configured to calculate the distance value between the target traffic environment information and the existing traffic environment information by a calculation formula of distance value in the reproducing kernel Hilbert space, the calculation formula of distance value includes:

$$MMD_H(D_S, D_T) = \left\| \frac{1}{n}\sum_{i=1}^n A^T s_{Si} - \frac{1}{m}\sum_{j=1}^m A^T s_{Tj} \right\|_H ;$$

wherein $MMD_H(D_S, D_T)$ represents the distance value; $D_S$ represents the existing traffic environment information; $D_T$ represents the target traffic environment information; n represents the number of samples in the existing traffic environment information; m represents the number of samples in the target traffic environment information; A represents the mapping relationship; T represents transposition; $s_S$ represents traffic environment information in the existing traffic environment information; $s_T$ represents traffic environment information in the target traffic environment information; and H represents the reproducing kernel Hilbert space.

According to the automatic driving system provided by the embodiment of the present disclosure, the first determine component may include:

a first determine unit configured to determine the mapping relationship by minimizing the distance value based on a regular linear regression method or a support vector machine method or a principal component analysis method.

Figure 4:
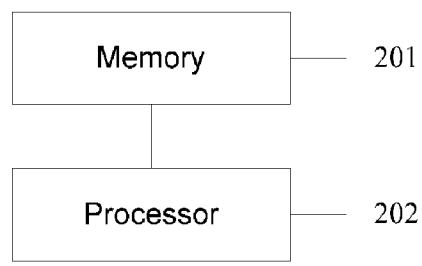
FIG. 4 is a structural schematic diagram of an automatic driving device provided by an embodiment of the present disclosure.

The present application further provides an automatic driving device and a non-transitory computer-readable storage medium which both have corresponding effects of the automatic driving method provided by the embodiments of the present disclosure. Please refer to FIG. 4, and FIG. 4 is a structural schematic diagram of an automatic driving device provided by an embodiment of the present disclosure.

The automatic driving device provided by the embodiment of the present disclosure includes a memory 201 and a processor 202, the memory 201 stores computer programs, and the processor 202 performs the computer programs to achieve following steps:

acquiring real-time traffic environment information in a travel process of an autonomous vehicle at a current moment;

mapping the real-time traffic environment information based on a preset mapping relationship to obtain mapped traffic environment information;

adjusting a target deep reinforcement learning model based on a pre-stored existing deep reinforcement learning model and the mapped traffic environment information; and judging whether automatic driving is finished, and in response to the automatic driving is not finished, returning to the step of acquiring the real-time traffic environment information in the travel process of the autonomous vehicle at the current moment, wherein the mapping relationship includes a mapping relationship between the real-time traffic environment information and existing traffic environment information of the existing deep reinforcement learning model.

The automatic driving device provided by the embodiment of the present disclosure includes the memory 201 and the processor 202, the memory 201 stores the computer programs, and the processor 202 performs the computer programs to achieve the following steps: processing the mapped traffic environment information based on parameters of an existing policy network of the existing deep reinforcement learning model to obtain a vehicle action; calculating a value of a value function of the vehicle action based on an evaluation network of a target deep reinforcement learning model; acquiring a return value of the vehicle action; and updating parameters of the evaluation network based on the return value and the value of the value function.

The automatic driving device provided by the embodiment of the present disclosure includes the memory 201 and the processor 202, the memory 201 stores the computer programs, and the processor 202 performs the computer programs to achieve the following steps: calculating a loss value by a calculation formula of loss function based on the return value and the value of the value function; and updating the parameters of the evaluation network by minimizing the loss value, wherein the calculation formula of loss function includes:

$$L = \frac{1}{N}\sum_t (r_t + \gamma Q'_\omega(s_{t+1}, a_{t+1}) - Q_\omega(s_t, a_t))^2;$$

wherein L represents the loss value; N represents a number of collected samples; $r_t$ represents a return value at time t; γ represents a discount factor, and 0<γ<1; $Q_\omega'(s_{t+1}, a_{t+1})$ represents a value of the value function calculated by a target network in the evaluation network at time t+1; $s_{t+1}$ represents traffic environment information at time t+1; $a_{t+1}$ represents a vehicle action at time t+1; $Q_\psi(s_t, a_t)$ represents a value of the value function calculated by a prediction network in the evaluation network at time t; $s_t$ represents traffic environment information at time t; and $a_t$ represents a vehicle action at time t.

The automatic driving device provided by the embodiment of the present disclosure includes the memory 201 and the processor 202, the memory 201 stores the computer programs, and the processor 202 performs the computer programs to achieve a following step: updating parameters of the policy network of the target deep reinforcement learning model after updating the parameters of the evaluation network based on the return value and the value of the value function.

The automatic driving device provided by the embodiment of the present disclosure includes the memory 201 and the processor 202, the memory 201 stores the computer programs, and the processor 202 performs the computer programs to achieve following steps: before mapping the real-time traffic environment information based on the preset mapping relationship to obtain the mapped traffic environment information, acquiring target traffic environment information; reading existing traffic environment information; calculating a distance value between the target traffic environment information and the existing traffic environment information in a reproducing kernel Hilbert space; and determining the mapping relationship by minimizing the distance value.

The automatic driving device provided by the embodiment of the present disclosure includes the memory 201 and the processor 202, the memory 201 stores the computer programs, and the processor 202 performs the computer programs to achieve a following step: calculating the distance value between the target traffic environment information and the existing traffic environment information by a calculation formula of distance value in the reproducing kernel Hilbert space, and the calculation formula of distance value includes:

$$MMD_H(D_S, D_T) = \left\| \frac{1}{n}\sum_{i=1}^{n} A^T s_{Si} - \frac{1}{m}\sum_{j=1}^{m} A^T s_{Tj} \right\|_H ;$$

wherein $MMD_H(D_S, D_T)$ represents the distance value; $D_S$ represents the existing traffic environment information; $D_T$ represents the target traffic environment information; n represents the number of samples in the existing traffic environment information; m represents the number of samples in the target traffic environment information; A represents the mapping relationship; T represents transposition; $s_S$ represents traffic environment information in the existing traffic environment information; $s_T$ represents traffic environment information in the target traffic environment information; and H represents the reproducing kernel Hilbert space.

The automatic driving device provided by the embodiment of the present disclosure includes the memory 201 and the processor 202, the memory 201 stores the computer programs, and the processor 202 performs the computer programs to achieve a following step: determining the mapping relationship by minimizing the distance value based on a regular linear regression method or a support vector machine method or a principal component analysis method.

Figure 5:
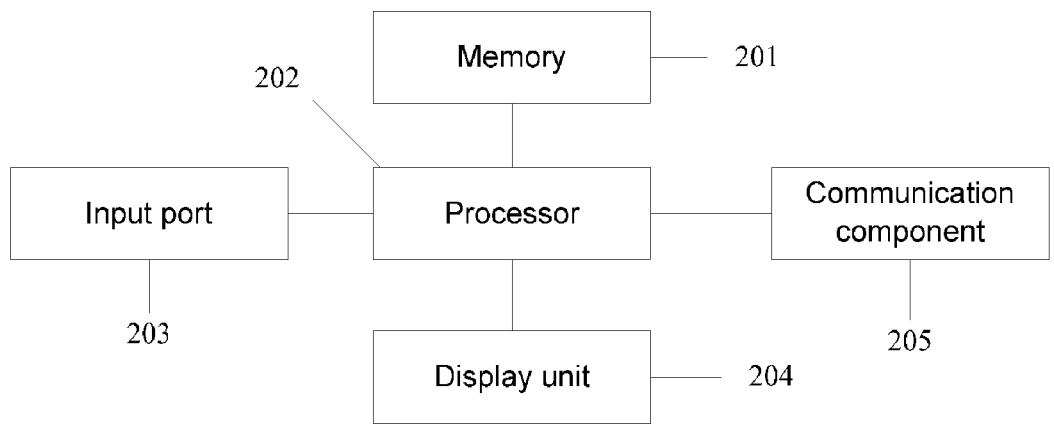
FIG. 5 is another structural schematic diagram of an automatic driving device provided by an embodiment of the present disclosure.

Please refer to FIG. 5, another automatic driving device provided by the embodiment of the present disclosure may further include: an input port 203 connected with the processor 202 and configured to transmit commands input from an outside to the processor 202; a display unit 204 connected with the processor 202 and connected to display a processing result of the processor 202 to the outside; and a communication component 205 connected with the processor 202 and configured to realize communication between the automatic driving device and the outside. The display unit 204 may be a display panel, a laser scanning type display, etc. A communication mode adopted by the communication component 205 includes, but is not limited to, a Mobile High-Definition Link (HML) technology, a Universal Serial Bus (USB), a High-Definition Multimedia Interface (HDMI), and wireless connection: a Wireless Fidelity (WiFi) technology, a bluetooth communication technology, a low-power-consumption bluetooth communication technology and an IEEE 802.11s-based communication technology.

According to the non-transitory computer-readable storage medium provided by the embodiment of the present disclosure, the non-transitory computer-readable storage medium stores computer program that, when executed by the processor, cause the processor to achieve following steps:
  acquiring real-time traffic environment information in a travel process of an autonomous vehicle at a current moment;
  mapping the real-time traffic environment information based on a preset mapping relationship to obtain mapped traffic environment information;
  adjusting a target deep reinforcement learning model based on a pre-stored existing deep reinforcement learning model and the mapped traffic environment information; and
  judging whether automatic driving is finished, and in response to the automatic driving is not finished, returning to perform the step of acquiring the real-time traffic environment information in the travel process of the autonomous vehicle at the current moment,
  wherein the mapping relationship includes a mapping relationship between the real-time traffic environment information and existing traffic environment information of the existing deep reinforcement learning model.

According to the non-transitory computer-readable storage medium provided by the embodiment of the present disclosure, the non-transitory computer-readable storage medium stores computer program that, when executed by the processor, cause the processor to achieve following steps: processing the mapped traffic environment information based on parameters of an existing policy network of the existing deep reinforcement learning model to obtain a vehicle action; calculating a value of a value function of the vehicle action based on an evaluation network of a target deep reinforcement learning model; acquiring a return value of the vehicle action; and updating parameters of the evaluation network based on the return value and the value of the value function.

According to the non-transitory computer-readable storage medium provided by the embodiment of the present disclosure, the non-transitory computer-readable storage medium stores computer program that, when executed by the processor, cause the processor to achieve following steps: calculating a loss value by a calculation formula of loss function based on the return value and the value of the value function; and updating the parameters of the evaluation network by minimizing the loss value, wherein the calculation formula of loss function includes:

$$L = \frac{1}{N}\sum_t (r_t + \gamma Q'_\omega(s_{t+1}, a_{t+1}) - Q_\omega(s_t, a_t))^2;$$

wherein L represents the loss value; N represents a number of collected samples; $r_t$ represents a return value at time t; $\gamma$ represents a discount factor, and $0<\gamma<1$; $Q_\omega'(s_{t+1}, a_{t+1})$ represents a value of the value function calculated by a target network in the evaluation network at time t+1; $s_{t+1}$ represents traffic environment information at time t+1; $a_{t+1}$ represents a vehicle action at time t+1; $Q_\omega(s_t, a_t)$ represents a value of the value function calculated by a prediction network in the evaluation network at time t; $s_t$ represents traffic environment information at time t; and $a_t$ represents a vehicle action at time t.

According to the non-transitory computer-readable storage medium provided by the embodiment of the present disclosure, the non-transitory computer-readable storage medium stores computer program that, when executed by the processor, cause the processor to achieve a following step: updating parameters of a policy network of the target deep reinforcement learning model after updating the parameters of the evaluation network based on the return value and the value of the value function.

According to the non-transitory computer-readable storage medium provided by the embodiment of the present disclosure, the non-transitory computer-readable storage medium stores computer program that, when executed by the processor, cause the processor to achieve following steps: before mapping the real-time traffic environment information based on the preset mapping relationship to obtain the mapped traffic environment information, acquiring target traffic environment information; reading existing traffic environment information; calculating a distance value between the target traffic environment information and the existing traffic environment information in a reproducing kernel Hilbert space; and determining the mapping relationship by minimizing the distance value.

According to the non-transitory computer-readable storage medium provided by the embodiment of the present disclosure, the non-transitory computer-readable storage medium stores computer program that, when executed by the processor, cause the processor to achieve a following step: calculating the distance value between the target traffic environment information and the existing traffic environment information by a calculation formula of distance value in a reproducing kernel Hilbert space, and
  the calculation formula of distance value includes:

$$MMD_H(D_S, D_T) = \left\| \frac{1}{n}\sum_{i=1}^n A^T s_{Si} - \frac{1}{m}\sum_{j=1}^m A^T s_{Tj} \right\|_H ;$$

wherein $MMD_H(D_S, D_T)$ represents the distance value; $D_S$ represents the existing traffic environment information; $D_T$ represents the target traffic environment information; n represents the number of samples in the existing traffic environment information; m represents the number of samples in the target traffic environment information; A represents the mapping relationship; T represents transposition; $s_S$ represents traffic environment information in the existing traffic environment information; $s_T$ represents traffic environment information in the target traffic environment information; and H represents the reproducing kernel Hilbert space.

According to the non-transitory computer-readable storage medium provided by the embodiment of the present disclosure, the non-transitory computer-readable storage medium stores computer program that, when executed by the processor, cause the processor to achieve a following step: determining the mapping relationship by minimizing the distance value based on a regular linear regression method or a support vector machine method or a principal component analysis method.

The non-transitory computer-readable storage medium involved in the present disclosure includes a Random Access Memory (RAM), an internal memory, a Read-Only Memory (ROM), an electrically programmable ROM, an electrically erasable programmable ROM, a register, a hard disk, a removable disk, a CD-ROM or any other form of storage medium known in the technical field.

Descriptions of related parts in the automatic driving system and device and the non-transitory computer-readable storage medium provided by the embodiments of the present disclosure refer to detailed descriptions of the corresponding parts in the automatic driving method provided by the embodiment of the present disclosure, which are not repeated herein. In addition, parts, consistent to corresponding technical solutions in the prior art in implementation principle, in the above technical solutions provided by the embodiments of the present disclosure are not described in detail so as to avoid excessive repetition.

It needs to be further explained that relation terms such as first and second herein are only used for distinguishing one entity or operation from another entity or operation rather than requiring or implying any practical relation or sequence between the entities or operations. In addition, terms "comprise", "include" or any other transformations thereof are intended to cover non-exclusive inclusion, and thus a process, a method, an object or a device including a series of elements not only includes those elements but also includes other elements not clearly listed, or further includes inherent elements for the process, the method, the object or the device. Elements limited by a statement "including a . . . ", without more limitations, indicate that additional same elements may exist in the process, the method, the object or the device including the elements.

Those skill in the art can realize or use the present disclosure according to the descriptions of the disclosed embodiments. More modifications for the embodiments are apparent to those skill in the art, and general principles defined herein may be realized in other embodiments without departing from the spirit or scope of the present disclosure. Thus, the present disclosure will not be limited by the embodiments shown herein but need to conform to a widest scope consistent to the principles and novel characteristics disclosed herein.

What is claimed is:

1. An automatic driving method, comprising:
   acquiring, by vehicle-mounted sensor apparatuses, real-time traffic environment information in a travel process of an autonomous vehicle at a current moment; wherein a next driving action of the autonomous vehicle is predicted according to the real-time traffic environment information in an automatic driving process;
   mapping, by an automatic driving computing device, the real-time traffic environment information based on a preset mapping relationship to obtain mapped traffic environment information;
   adjusting, by the automatic driving computing device, a target deep reinforcement learning model based on a pre-stored existing deep reinforcement learning model and the mapped traffic environment information; and
   judging, by the automatic driving computing device, whether automatic driving is finished, and in response to the automatic driving is not finished, returning to perform the step of acquiring the real-time traffic environment information in the travel process of the autonomous vehicle at the current moment,
   wherein the mapping relationship comprises a mapping relationship between the real-time traffic environment information and existing traffic environment information of the existing deep reinforcement learning model; the mapped traffic environment information is processed on the basis of parameters of existing policy network of the existing deep reinforcement learning model to obtain the next driving action of the autonomous vehicle;
   wherein before mapping the real-time traffic environment information based on the preset mapping relationship to obtain the mapped traffic environment information, the method further comprises: acquiring target traffic environment information; reading the existing traffic environment information; calculating a distance value between the target traffic environment information and the existing traffic environment information in a reproducing kernel Hilbert space; and determining the mapping relationship by minimizing the distance value.

2. The method as claimed in claim 1, wherein the step of adjusting the target deep reinforcement learning model based on the pre-stored existing deep reinforcement learning model and the mapped traffic environment information comprises:
   processing the mapped traffic environment information based on parameters of an existing policy network of the existing deep reinforcement learning model to obtain a vehicle action;
   calculating a value of a value function of the vehicle action based on an evaluation network of the target deep reinforcement learning mode;
   acquiring a return value of the vehicle action; and
   updating parameters of the evaluation network based on the return value and the value of the value function.

3. The method as claimed in claim 2, wherein the step of updating parameters of the evaluation network based on the return value and the value of the value function comprises:
   calculating a loss value by a calculation formula of loss function based on the return value and the value of the value function; and
   updating the parameters of the evaluation network by minimizing the loss value,
   wherein, the loss function computational formula comprises:

$$L = \frac{1}{N}\sum_{t}(r_t + \gamma Q'_\omega(s_{t+1}, a_{t+1}) - Q_\omega(s_t, a_t))^2;$$

wherein, L represents the loss value; N represents a number of collected samples; $r_t$ represents a return value at time t; $\gamma$ represents a discount factor, and $0<\gamma<1$; $Q'_\omega(s_{t+1}, a_{t+1})$ represents a value of the value function calculated by a target network in the evaluation network at time t+1; $s_{t+1}$ represents traffic environment information at time t+1; $a_{t+1}$ represents a vehicle action at time t+1; $Q_\omega(s_t, a_t)$ represents a value of the value function calculated by a prediction network in the evaluation network at time t; $s_t$ represents traffic environment information at time t; and $a_t$ represents a vehicle action at time t.

4. The method as claimed in claim 2, wherein after updating the parameters of the evaluation network based on the return value and the value of the value function, the method further comprises:
   updating parameters of a policy network of the target deep reinforcement learning model.

5. The method as claimed in claim 1, wherein the step of calculating the distance value between the target traffic environment information and the existing traffic environment information in the reproducing kernel Hilbert space comprises:
   calculating the distance value between the target traffic environment information and the existing traffic environment information by a calculation formula of distance value in the reproducing kernel Hilbert space,
wherein, the calculation formula of distance value comprises:

$$MMD_H(D_S, D_T) = \left\| \frac{1}{n}\sum_{i=1}^{n} A^T s_{Si} - \frac{1}{m}\sum_{j=1}^{m} A^T s_{Tj} \right\|_H ;$$

wherein, $MMD_H(D_S, D_T)$ represents the distance value; $D_S$ represents the existing traffic environment information; $D_T$ represents the target traffic environment information; n represents the number of samples in the existing traffic environment information; m represents the number of samples in the target traffic environment information; A represents the mapping relationship; T represents transposition; $s_S$ represents traffic environment information in the existing traffic environment information; $s_T$ represents traffic environment information in the target traffic environment information; and H represents the reproducing kernel Hilbert space.

6. The method as claimed in claim 5, wherein, the step of determining the mapping relationship by minimizing the distance value comprises:
determining the mapping relationship by minimizing the distance value based on a regular linear regression method or a support vector machine method or a principal component analysis method.

7. An automatic driving device, comprising:
a memory configured to store computer programs; and
a processor configured to perform the computer programs to perform the steps of:
acquiring, by vehicle-mounted sensor apparatuses, real-time traffic environment information in a travel process of an autonomous vehicle at a current moment; wherein a next driving action of the autonomous vehicle is predicted according to the real-time traffic environment information in an automatic driving process;
mapping, by an automatic driving computing device, the real-time traffic environment information based on a preset mapping relationship to obtain mapped traffic environment information;
adjusting, by the automatic driving computing device, a target deep reinforcement learning model based on a pre-stored existing deep reinforcement learning model and the mapped traffic environment information; and
judging, by the automatic driving computing device, whether automatic driving is finished, and under a condition that the automatic driving is not finished, returning to perform the step of acquiring the real-time traffic environment information in the travel process of the autonomous vehicle at the current moment,
wherein the mapping relationship comprises a mapping relationship between the real-time traffic environment information and existing traffic environment information of the existing deep reinforcement learning model; the mapped traffic environment information is processed on the basis of parameters of existing policy network of the existing deep reinforcement learning model to obtain the next driving action of the autonomous vehicle;
the processor is configured to: acquire target traffic environment information; read the existing traffic environment information; calculate a distance value between the target traffic environment information and the existing traffic environment information in a reproducing kernel Hilbert space; and determine the mapping relationship by minimizing the distance value.

8. A non-transitory computer-readable storage medium storing computer program that, when executed by a processor, cause the processor to:
acquire, by vehicle-mounted sensor apparatuses, real-time traffic environment information in a travel process of an autonomous vehicle at a current moment; wherein a next driving action of the autonomous vehicle is predicted according to the real-time traffic environment information in an automatic driving process;
map, by an automatic driving computing device, the real-time traffic environment information based on a preset mapping relationship to obtain mapped traffic environment information;
adjust, by the automatic driving computing device, a target deep reinforcement learning model based on a pre-stored existing deep reinforcement learning model and the mapped traffic environment information; and
judge, by the automatic driving computing device, whether automatic driving is finished, and under a condition that the automatic driving is not finished, returning to perform the step of acquiring the real-time traffic environment information in the travel process of the autonomous vehicle at the current moment,
wherein the mapping relationship comprises a mapping relationship between the real-time traffic environment information and existing traffic environment information of the existing deep reinforcement learning model; the mapped traffic environment information is processed on the basis of parameters of existing policy network of the existing deep reinforcement learning model to obtain the next driving action of the autonomous vehicle;
the processor is configured to: acquire target traffic environment information; read the existing traffic environment information; calculate a distance value between the target traffic environment information and the existing traffic environment information in a reproducing kernel Hilbert space; and determine the mapping relationship by minimizing the distance value.

9. The method as claimed in claim 2, wherein, the step of acquiring a return value of the vehicle action comprises:
acquiring the return value according to the vehicle action in combination with a set standard.

10. The automatic driving device as claimed in claim 7, the processor is configured to:
process the mapped traffic environment information based on parameters of an existing policy network of the existing deep reinforcement learning model to obtain a vehicle action;
calculate a value of a value function of the vehicle action based on an evaluation network of the target deep reinforcement learning model;
acquire a return value of the vehicle action; and
update parameters of the evaluation network based on the return value and the value of the value function.

11. The automatic driving device as claimed in claim 10, the processor is configured to:
calculate a loss value by a calculation formula of loss function based on the return value and the value of the value function; and
update the parameters of the evaluation network by minimizing the loss value,
wherein the calculation formula of loss function comprises:

$$L = \frac{1}{N}\sum_t (r_t + \gamma Q'_\omega(s_{t+1}, a_{t+1}) - Q_\omega(s_t, a_t))^2;$$

wherein L represents the loss value; N represents a number of collected samples; $r_t$ represents a return value at time t; $\gamma$ represents a discount factor, and $0<\gamma<1$; $Q'_\omega(s_{t+1}, a_{t+1})$ represents a value of the value function calculated by a target network in the evaluation network at time t+1; $s_{t+1}$ represents traffic environment information at time t+1; $a_{t+1}$ represents a vehicle action at time t+1; $Q_\omega(s_t, a_t)$ represents a value of the value function calculated by a prediction network in the evaluation network at time t; $s_t$ represents traffic environment information at time t; and $a_t$ represents a vehicle action at time t.

12. The automatic driving device as claimed in claim 10, the processor is configured to:
update parameters of a policy network of the target deep reinforcement learning model.

13. The automatic driving device as claimed in claim 7, the processor is configured to:
calculate the distance value between the target traffic environment information and the existing traffic environment information by a calculation formula of distance value in the reproducing kernel Hilbert space,
wherein, the calculation formula of distance value comprises:

$$MMD_H(D_S, D_T) = \left\| \frac{1}{n}\sum_{i=1}^{n} A^T s_{Si} - \frac{1}{m}\sum_{j=1}^{m} A^T s_{Tj} \right\|_H ;$$

wherein, $MMD_H(D_S, D_T)$ represents the distance value; $D_S$ represents the existing traffic environment information; $D_T$ represents the target traffic environment information; n represents the number of samples in the existing traffic environment information; m represents the number of samples in the target traffic environment information; A represents the mapping relationship; T represents transposition; $s_S$ represents traffic environment information in the existing traffic environment information; $s_T$ represents traffic environment information in the target traffic environment information; and H represents the reproducing kernel Hilbert space.

14. The automatic driving device as claimed in claim 13, the processor is configured to:
determine the mapping relationship by minimizing the distance value based on a regular linear regression method or a support vector machine method or a principal component analysis method.

15. The non-transitory computer-readable storage medium as claimed in claim 8, the processor is configured to:
process the mapped traffic environment information based on parameters of an existing policy network of the existing deep reinforcement learning model to obtain a vehicle action;
calculate a value of a value function of the vehicle action based on an evaluation network of the target deep reinforcement learning model;
acquire a return value of the vehicle action; and
update parameters of the evaluation network based on the return value and the value of the value function.

16. The non-transitory computer-readable storage medium as claimed in claim 15, the processor is configured to:
calculate a loss value by a calculation formula of loss function based on the return value and the value of the value function; and
update the parameters of the evaluation network by minimizing the loss value,
wherein, the loss function computational formula comprises:

$$L = \frac{1}{N}\sum_t (r_t + \gamma Q'_\omega(s_{t+1}, a_{t+1}) - Q_\omega(s_t, a_t))^2;$$

wherein, L represents the loss value; N represents a number of collected samples; $r_t$ represents a return value at time t; $\gamma$ represents a discount factor, and $0<\gamma<1$; $Q'_\omega(s_{t+1}, a_{t+1})$ represents a value of the value function calculated by a target network in the evaluation network at time t+1; $s_{t+1}$ represents traffic environment information at time t+1; $a_{t+1}$ represents a vehicle action at time t+1; $Q_\omega(s_t, a_t)$ represents a value of the value function calculated by a prediction network in the evaluation network at time t; $s_t$ represents traffic environment information at time t; and $a_t$ represents a vehicle action at time t.

17. The non-transitory computer-readable storage medium as claimed in claim 15, the processor is configured to:
update parameters of a policy network of the target deep reinforcement learning model.

\* \* \* \* \*